(12) United States Patent
Soldan et al.

(10) Patent No.: US 8,707,342 B2
(45) Date of Patent: Apr. 22, 2014

(54) REFERENCING DATA IN TRIGGERS FROM APPLICATIONS

(75) Inventors: Eric R. Soldan, Saratoga, CA (US); Bradley R. Pettit, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 12/242,294

(22) Filed: Sep. 30, 2008

(65) Prior Publication Data

US 2009/0320066 A1   Dec. 24, 2009

Related U.S. Application Data

(63) Continuation-in-part of application No. 12/141,924, filed on Jun. 19, 2008.

(51) Int. Cl.
*H04H 60/29* (2008.01)

(52) U.S. Cl.
USPC .............. 725/22; 725/32; 725/131; 725/139; 725/151

(58) Field of Classification Search
USPC ......... 725/32, 22, 34–36, 131, 134, 139, 142, 725/151
See application file for complete search history.

(56) References Cited

U.S. PATENT DOCUMENTS

| | | | |
|---|---|---|---|
| 6,460,180 B1 * | 10/2002 | Park et al. ................. | 725/40 |
| 6,473,804 B1 | 10/2002 | Kaiser et al. | |
| 6,651,253 B2 | 11/2003 | Dudkiewicz et al. | |
| 6,845,485 B1 | 1/2005 | Shastri et al. | |
| 6,973,256 B1 | 12/2005 | Dagtas | |
| 7,178,162 B2 | 2/2007 | Martinolich et al. | |
| 7,237,250 B2 | 6/2007 | Kanojia et al. | |
| 7,668,748 B1 | 2/2010 | Veach | |
| 7,818,392 B1 | 10/2010 | Martino et al. | |
| 7,900,233 B1 | 3/2011 | Godin | |
| 2002/0059644 A1 | 5/2002 | Andrade et al. | |
| 2002/0100043 A1 * | 7/2002 | Lowthert et al. ................. | 725/36 |
| 2002/0162118 A1 | 10/2002 | Levy et al. | |

(Continued)

FOREIGN PATENT DOCUMENTS

| | | |
|---|---|---|
| WO | WO0223907 | 3/2002 |
| WO | 2008021496 A2 | 2/2008 |
| WO | 2008085940 A2 | 7/2008 |

OTHER PUBLICATIONS

Toshimitsu, et al., "Method of Video Scene Search Using Closed Caption", vol. 27, No. 37, 2006-2007 Japan Science and Technology Agency,1.

(Continued)

*Primary Examiner* — Farzana Hossain
(74) *Attorney, Agent, or Firm* — Micah Goldsmith; Glen Johnson; Micky Minhas

(57) ABSTRACT

In accordance with one or more aspects of the referencing data in triggers from applications, a device can store multiple triggers for media content. For each of these triggers, a check is made as to whether a presentation of media content satisfies a criteria portion of the trigger. When the presentation satisfies the criteria portion, one or more actions in a payload portion of the trigger are performed. Additionally, data in the triggers can be referenced by applications executing on the device. These applications include applications that are launched as part of the one or more actions when the criteria portion of a trigger is satisfied, as well as other applications executing on the device.

10 Claims, 6 Drawing Sheets

(56) References Cited

U.S. PATENT DOCUMENTS

| | | | |
|---|---|---|---|
| 2002/0184634 A1* | 12/2002 | Cooper | 725/51 |
| 2002/0188958 A1* | 12/2002 | Miller | 725/112 |
| 2003/0046690 A1 | 3/2003 | Miller | |
| 2003/0051253 A1 | 3/2003 | Barone, Jr. | |
| 2003/0070169 A1* | 4/2003 | Beyers et al. | 725/51 |
| 2003/0126621 A1 | 7/2003 | Leak et al. | |
| 2003/0145331 A1* | 7/2003 | Escobar et al. | 725/110 |
| 2004/0003406 A1* | 1/2004 | Billmaier | 725/60 |
| 2004/0010806 A1 | 1/2004 | Yuen et al. | |
| 2004/0034873 A1 | 2/2004 | Zenoni | |
| 2004/0117819 A1 | 6/2004 | Yu | |
| 2004/0210942 A1 | 10/2004 | Lemmons | |
| 2004/0237120 A1 | 11/2004 | Lewin et al. | |
| 2004/0244057 A1 | 12/2004 | Wallace et al. | |
| 2005/0015796 A1* | 1/2005 | Bruckner et al. | 725/32 |
| 2006/0136982 A1 | 6/2006 | Martinolich et al. | |
| 2006/0143658 A1 | 6/2006 | Stone | |
| 2006/0168624 A1* | 7/2006 | Carney et al. | 725/51 |
| 2006/0212897 A1 | 9/2006 | Li et al. | |
| 2006/0287913 A1 | 12/2006 | Baluja | |
| 2007/0079353 A1 | 4/2007 | Boortz | |
| 2007/0204285 A1 | 8/2007 | Louw | |
| 2007/0299870 A1 | 12/2007 | Finch | |
| 2007/0300280 A1* | 12/2007 | Turner et al. | 725/135 |
| 2008/0015932 A1 | 1/2008 | Haeuser et al. | |
| 2008/0033822 A1 | 2/2008 | Merdinger | |
| 2008/0046917 A1 | 2/2008 | de Heer | |
| 2008/0243756 A1 | 10/2008 | Moon et al. | |
| 2008/0249841 A1 | 10/2008 | Ruark et al. | |
| 2009/0049090 A1 | 2/2009 | Shenfield et al. | |
| 2009/0142031 A1 | 6/2009 | Godtland et al. | |
| 2009/0320061 A1 | 12/2009 | Pettit | |
| 2009/0320064 A1 | 12/2009 | Soldan | |
| 2010/0100437 A1 | 4/2010 | Dean et al. | |
| 2010/0215340 A1* | 8/2010 | Pettit et al. | 386/83 |

OTHER PUBLICATIONS

Park, et al., "Extracting Salient Keywords from Instructional Videos Using Joint Text, Audio and Visual Cues", *Proceedings of the Human Language Technology Conference of the North American Chapter of the ACL*, Association for Computational Linguistics, 2006,(Jun. 2006),pp. 109-112

Salton, et al., "Term-Weighting Approaches in Automatic Text Retrieval", *Information Processing and Management*, vol. 24, No. 5, Pergamon Press, Inc.,(1988),pp. 513-523.

Soares, et al., "Ginga-NCL: The Declarative Environment of the Brazilian Digital TV System", Retrieved at <<http://www.ncl.org.br/documentos/JBCS2007.pdf>>, pp. 20.

"Trigger Rules", Retrieved at <<http://technet2.microsoft.com/windowsserver/en/library/190e23b8-a499-431c-9ae7-9547d88edadb1033.mspx?mfr=true>>, Jan. 21, 2005, pp. 1-4.

"Non-Final Office Action", U.S. Appl. No. 12/244,451, (Dec. 13, 2011),21 pages.

"Final Office Action", U.S. Appl. No. 12/244,451, (Mar. 14, 2012), 21 pages.

"Restriction Requirement", U.S. Appl. No. 12/141,924, (Apr. 23, 2012), 6 pages.

"Non-Final Office Action", U.S. Appl. No. 12/141,924, (Nov. 6, 2012), 13 pages.

"Non-Final Office Action", U.S. Appl. No. 12/244,451, (Nov. 16, 2012), 17 pages.

"Final Office Action", U.S. Appl. No. 12/141,924, (May 13, 2013), 17 pages.

"Final Office Action", U.S. Appl. No. 12/244,451, (Jun. 21, 2013), 21 pages

"Non-Final Office Action", U.S. Appl. No. 12/141,924, (Sep. 25, 2013), 18 pages.

"Non-Final Office Action", U.S. Appl. No. 12/244,451, (Sep. 25, 2013), 12 pages.

* cited by examiner

REFERENCING DATA IN TRIGGERS FROM APPLICATIONS

RELATED APPLICATIONS

This application is a continuation-in-part of U.S. patent application Ser. No. 12/141,924, filed Jun. 19, 2008, which is hereby incorporated by reference herein.

BACKGROUND

With the merging of computing devices and television viewing, enhanced functionality beyond that available in typical televisions can be made available to television viewers. For example, applications running on computing devices can display user interfaces concurrently with television programs being displayed. Unfortunately, difficulties remain in tying the behavior of such applications to the particular television programs being displayed, and/or to the desires of the application authors. This can be problematic because it makes authoring and deploying such applications more difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, for each of multiple triggers a check is made on a device as to whether a presentation of media content satisfies a criteria portion of the trigger. When the presentation satisfies the criteria portion, one or more actions in a payload portion of the trigger are performed, the one or more actions including launching an application. A reference to data in the trigger is also received from the application, and the referenced data in the trigger is returned to the application.

In accordance with one or more aspects, a reference to data in a trigger is received from an application executing on a device. The trigger includes both a criteria portion and a payload portion. The criteria portion identifies one or more criteria, and the payload portion identifies one or more actions to be performed when the one or more criteria are satisfied by data corresponding to media content being presented. The referenced data is returned to the application.

In accordance with one or more aspects, a device includes a trigger store and a monitor module. The trigger store is to store multiple triggers, each of the multiple triggers comprising a criteria portion and a payload portion. The criteria portion identifies one or more criteria and the payload portion identifies one or more actions to be performed. The monitor module is to monitor data corresponding to media content being presented and detect when the data satisfies the one or more criteria of one of the multiple triggers. The monitor module is also to perform the one or more actions identified in the one trigger when the data satisfies the one or more criteria, and to allow data in the trigger to be referenced by an application executing on the device.

BRIEF DESCRIPTION OF THE DRAWINGS

The same numbers are used throughout the drawings to reference like features.

DETAILED DESCRIPTION

Referencing data in triggers from applications is discussed herein. A trigger for use with media content includes both a criteria portion and a payload portion. The criteria portion includes one or more criteria that are to be satisfied. When the one or more criteria are satisfied, one or more actions included in the payload portion are performed. These one or more actions can include launching an application. Applications can also reference data within the payload portion of one or more triggers in different manners, such as through data-binding or an application programming interface (API), allowing applications to access and obtain data from triggers.

Figure 1:
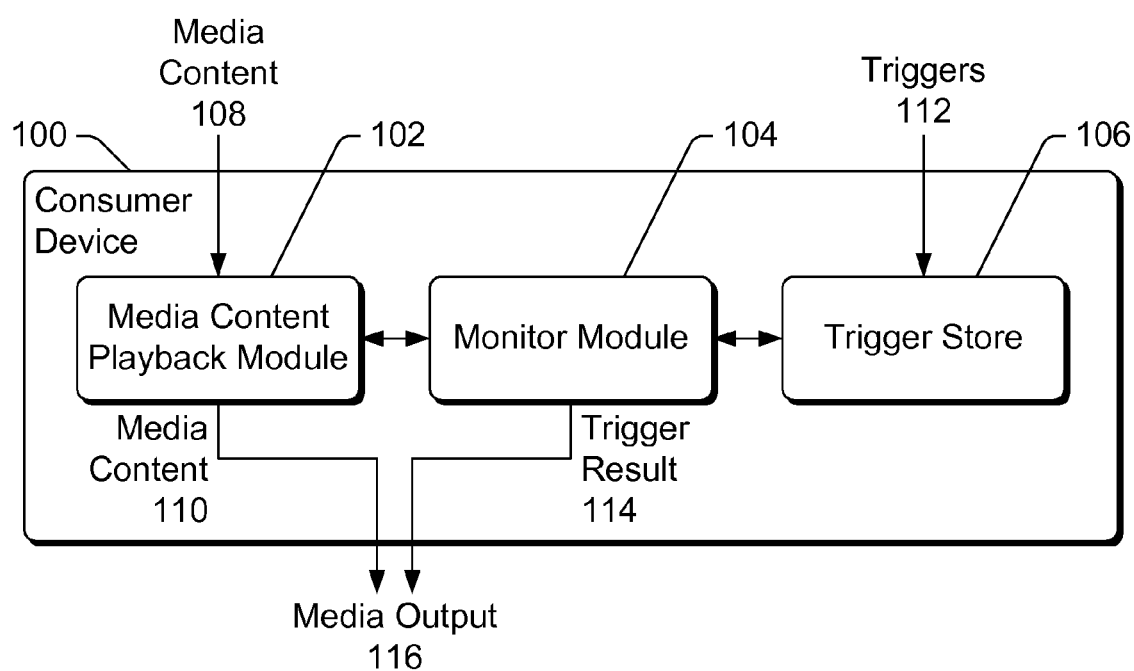
FIG. 1 illustrates an example consumer device implementing the referencing of data in triggers from applications in accordance with one or more embodiments.

FIG. 1 illustrates an example consumer device 100 implementing the referencing data in triggers from applications in accordance with one or more embodiments. Consumer device 100 can be any of a variety of devices that output video for display. For example, consumer device 100 can be a computer, such as a desktop computer, server computer, a mobile station, an entertainment appliance, a set-top box communicatively coupled to a display device, a video playback device (e.g., digital video recorder (DVR), digital versatile disk (DVD) player, etc.), a television, a cell or other wireless phone, a game console, an automotive PC, and so forth. Thus, consumer device 100 can range from full resource devices with substantial memory and processor resources (e.g., personal computers, game consoles, etc.) to a low-resource device with limited memory and/or processing resources (e.g., traditional set-top boxes, hand-held game consoles, DVD players, etc.).

Consumer device 100 includes a media content playback module 102, a monitor module 104, and a trigger store 106. Media content refers to one or more of a variety of different types of content that can be played back to a user. Oftentimes media content is audio/video content (e.g., particular programs such as movies, sitcoms, commercials, news broadcasts, documentaries, sporting events, and so forth). Alternatively, media content can be only one type of content (e.g., just audio content, just video content, etc.), or can be other types of content (e.g., images, text, and so forth).

Media content playback module 102 receives media content 108 and outputs media content 110. Media content playback module 102 converts media content 108 into a format that can be played back (e.g., displayed by a display device, played back by speakers, etc.) and outputs the converted media content as media content 110. Media content playback module 102 can also receive input from a user (e.g., via a remote control device) or other component or module of device 100 to control the output of media content 110, such as to pause playback of the content, select particular media content for playback, fast forward or rewind through the media content, and so forth.

Media content 110, along with trigger result 114 as discussed in more detail below, are output by consumer device 100 as media output 116. In one or more embodiments, consumer device 100 plays back media output 116 (e.g., displays video content, plays back audio content, and so forth). In other embodiments consumer device 100 generates one or more signals based on media content 108 and/or trigger result 114 that is output to one or more other devices (e.g., televisions, projectors, speakers, etc.) which in turn present media output 116. In one or more embodiments, consumer device 100 can play back, or generate signals based on, multiple different media content 108 concurrently as media output 116. This different media content can be played back, for example, in different portions of a screen (e.g., Picture-in-Picture or other windows or frames), on different screens or displays, and so forth. The criteria for different triggers can be satisfied by different ones of the media content, resulting in different trigger results 114 for the different media content.

Media content 108 can be received from a variety of different sources. These sources can be local sources, such as a hard disk or a DVD that is inserted into, coupled to, or included as part of consumer device 100. These sources can also be remote sources, such as one or more remote servers or other devices making content 108 available to consumer device 100. Remote sources can make content 108 available over a variety of different types of networks, such as one or more of the Internet, a wide area network (WAN), a local area network (LAN), a wireless network, a telephone network, an intranet, and so forth.

In one or more embodiments media content 108 also includes metadata. The metadata can be included as part of (e.g., embedded in) other types of content (e.g., included in a vertical blanking interval (VBI) of video content, included in a packet header, and so forth). Alternatively, this metadata can be separate from other types of content, such as being included in a separate stream or channel from the audio, video, and/or other types of content. This metadata included in media content 108 is associated with, and describes, the audio, video, and/or other types of content in media content 108. Examples of such metadata include closed captioning data that is a text version of the audio content included in media content 108, teletext data corresponding to media content 108, song or program title information corresponding to media content 108, and so forth.

Trigger store 106 receives and stores triggers 112. Triggers 112 can be received from a variety of different sources. Analogous to media content 108, these sources can be local sources or remote sources making triggers 112 available over a variety of different types of networks. By way of example, triggers 112 can be received with media content (e.g., embedded therein, as part of a separate stream, in metadata of the media content, etc.), can be received with programming guide data, can be received via a separate communication with a trigger source, and so forth.

Each trigger 112 includes a payload portion identifying one or more actions to be performed, and a criteria portion identifying one or more criteria that are to be satisfied in order for the one or more actions to be performed. Trigger store 106 can be implemented as part of consumer device 100, or alternatively can be implemented on a removable storage device (e.g., optical disk, flash memory, etc.) or on a remote storage device (e.g., a server computer, other consumer device, etc.).

Figure 2:
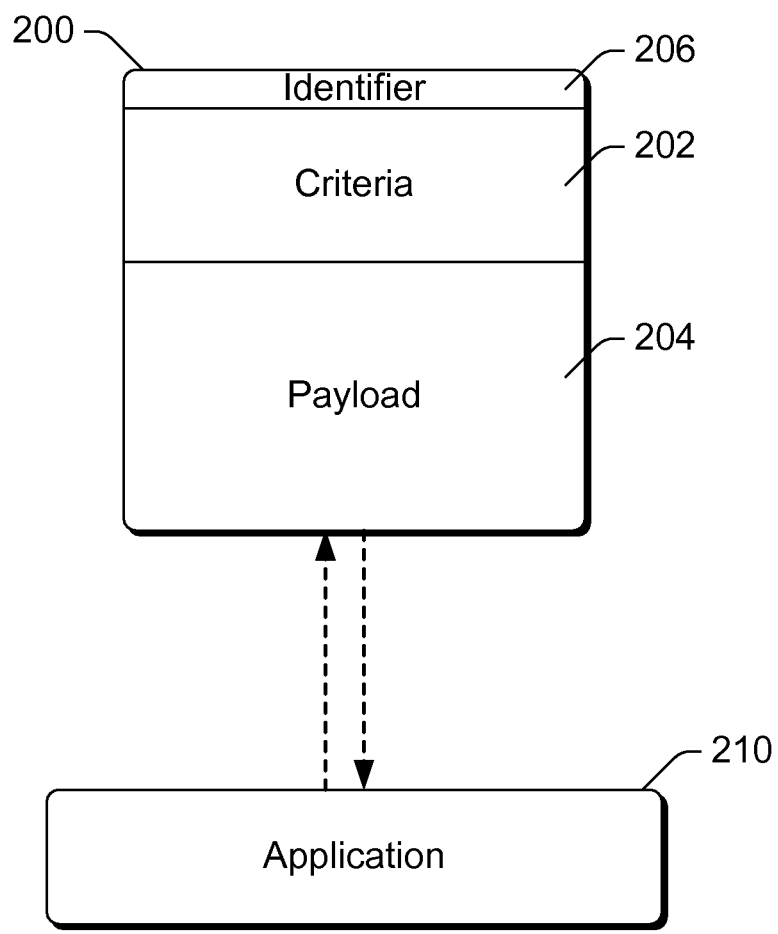
FIG. 2 illustrates an example trigger that can be used with the referencing data in triggers from applications in accordance with one or more embodiments.

FIG. 2 illustrates an example trigger 200 that can be used with the referencing data in triggers from applications in accordance with one or more embodiments. Trigger 200 includes a criteria portion 202 and a payload portion 204. In one or more embodiments, trigger 200 also includes a trigger identifier of itself, shown as identifier 206. In other embodiments no such identifier is included.

Payload portion 204 identifies one or more actions to be performed when the criteria in portion 202 are satisfied. Indicating that the one or more actions in payload portion 204 are to be performed due to the criteria in portion 202 being satisfied is also referred to as firing trigger 200. A variety of different actions can be included in payload portion 204. For example, the one or more actions in a payload portion can include displaying advertising content, creating a new trigger, executing an application, retrieving and displaying content from a remote source (e.g., as identified by a Uniform Resource Locator (URL)), firing another trigger, and so forth.

Various criteria can be included in criteria portion 202. In one or more embodiments, this criteria includes an identifier of particular media content. This identifier can be, for example, a title or name of the particular media content, a summary or other description of the content, or some other identifier. When such criteria are included in criteria portion 202, the one or more actions in payload portion 204 are performed only when that particular identified media content is being presented.

In one or more other embodiments, criteria portion 202 includes a time range. This time range can be, for example, a range of seconds, minutes, hours, days, and so forth. During presentation of media content, a current time is maintained and/or accessed. This current time can be, for example, a system or device time maintained by the consumer device present in the media content. When such time range criteria are included in criteria portion 202, the one or more actions in payload portion 204 are performed only when the current time is within the time range identified in criteria portion 202.

In one or more other embodiments, criteria portion 202 includes a channel identifier. This channel identifier can be, for example, a channel number, a call sign or other identifier of a broadcaster associated with the channel, and so forth. When such criteria are included in criteria portion 202, the one or more actions in payload portion 204 are performed only when the media content on that identified channel is being presented and/or that identified channel is tuned to.

Additionally, data from trigger 200 can be referenced by an application 210, allowing the application to retrieve or obtain particular data from trigger 200. This data made available to the application 210 can be one or more criteria from criteria portion 202, one or more actions from payload portion 204, or other data stored in trigger 200. This application 210 to which the data of the trigger is made available can be monitor module 104 of FIG. 1, or alternatively another application executing on device 100 of FIG. 1. Additionally, this application 210 to which the data of the trigger is made available can be an already executing application, or alternatively an application that is executed in response to the one or more criteria in criteria portion 202 being satisfied. The data can be made available to application 210 in one or more of a variety of different manners, such as passing the data as one or more parameters when application 210 begins execution (e.g., is launched), by exposing an API that application 210 can invoke to obtain the data, through data-binding, by receiving messages or other notifications from monitor module 104 of FIG. 1, and so forth. Additionally, the data of the trigger can be made available to application 210 regardless of whether the one or more criteria in criteria portion 202 are satisfied.

Returning to FIG. 1, monitor module 104 monitors media content 108 and/or playback module 102 to identify when the criteria of one or more triggers 112 are satisfied. Monitor module 104 can communicate with playback module 102 to identify the particular media content 110 being output by module 102 at any given time. Alternatively, monitor module 104 can receive media content 108 and monitor this received content directly rather than via playback module 102. Additional information regarding playback media content 100 can also be obtained from playback module 102, such as an identifier of a program being played back, an identifier of a channel tuned to, and so forth.

In one or more embodiments, monitor module 104 monitors the metadata of media content 108 and/or media content 108 in determining whether and when the criteria of a trigger are satisfied. When monitor module 104 determines that the one or more criteria of a trigger 112 are satisfied, monitor module 104 performs the one or more actions in the payload portion of the trigger. In response to performing these one or more actions, monitor module 104 generates a trigger result 114 that is output by consumer device 100. Media content 110 and/or trigger result 114 are output by consumer device 100 as media output 116. Media content 110 and trigger result 114 can be output concurrently as media output 116 or alternatively separately as discussed in more detail below.

Trigger result 114 can be the output of a variety of different types of content, such as video content, image content, audio content, and so forth as discussed above. Trigger result 114 can be presented concurrently with presentation of media content 110. For example, trigger result 114 can be video content or an image that is displayed overlaid on media content 110, such as a small icon at the bottom of a display. These small icons can also be referred to as "bugs". By way of another example, trigger result 114 can be audio content that is played back concurrently with media content 110. By way of yet another example, trigger result 114 can be video, text, graphic, image, and so forth content that is displayed in a window (such as a picture-in-picture (PIP) window) separate from media content 110. Alternatively, trigger result 114 can be presented separately from the presentation of media content 110. For example, playback of media content 110 can be paused while trigger result 114 is presented.

Additionally, it should be noted that in order to perform the one or more actions identified in the payload portion of a trigger, monitor module 104 may access one or more other devices. For example, monitor module 104 may access a remote device over a network to retrieve content to be displayed as trigger result 114. In one or more embodiments, monitor module 104 accesses a remote server over the Internet to retrieve one or more images or Web pages to be displayed as trigger result 114.

Alternatively, in one or more embodiments monitor module 104 invokes one or more other components or modules to generate the presentation of trigger result 114. For example, monitor module 104 can invoke a Web browser module, a remote device communication module (e.g., supporting RDP (Remote Desktop Protocol)), other applications that display or otherwise present content, and so forth. Such other components or modules can be invoked in a variety of different manners, such as firing an event that is dispatched to the appropriate component or module by an event dispatcher, invoking an application programming interface (API) exposed by the component or module, and so forth.

One or more actions in the payload portion of a trigger can involve execution of an application on device 100 (e.g., application 210 of FIG. 2). This application can perform a variety of different functions. In one or more embodiments, the application presents a user interface to the user of device 100. This user interface can display or otherwise present information to the user, such as advertising content, a web page (e.g., retrieved over the Internet from a URL in the trigger), additional information describing the media content being presented, and so forth. The user interface can also support user interaction, allowing the user to input a variety of different information or selections, such as entering an email address of the user, selecting a link to a web page, selecting a displayed icon, and so forth.

The application can also perform other operations in addition to, or in place of, presenting a user interface. For example, an application can monitor the performance of device 100, an application can alter settings of device 100 to improve the quality of the playback of the media content, an application can record or schedule a recording of other media content, and so forth.

It should be noted that the application can be explicitly identified by the trigger, such as by having an identifier and/or location of the application being included in the trigger. Alternatively, the trigger can be identified in other manners. In one or more embodiments, monitor module 104 can maintain a record or mapping of particular types of actions to particular programs. For example, monitor module 104 can maintain a record that URLs are associated with a Web browser application. Accordingly, a Web browser application is inherently identified by a trigger including an action of a URL. Alternatively, such a record or mapping can be pre-programmed into module 104, can be maintained or pre-programmed into another component or module, and so forth.

The application can execute on device 100 in a variety of different manners. The application can be a stand-alone program, or alternatively a program that incorporates or accesses instructions from other libraries, components, and so forth. The application can be a compiled program, uncompiled program, scripting language application, and so forth.

In one or more embodiments, this application is an application that is launched by one or more of the actions in the payload portion of the trigger. One or more of the actions can identify an application that is to be launched. When the trigger is fired, monitor module 104 identifies this application and launches (initiates execution of) the application. In one or more embodiments, monitor module 104 launches the application only if the application is not already executing.

In other embodiments, this application is an application that is already executing on device 100. One or more actions can identify an application that is to be notified. When the trigger is fired, monitor module 104 identifies this application and sends a message to or otherwise notifies this application.

Regardless of whether the application is launched or is an already executing application, data from the fired trigger is made available to the application. This data can take a variety of different forms, including one or more criteria from the criteria portion of the fired trigger and/or data from the payload portion of the fired trigger. In situations where less than all of the criteria in the criteria portion caused the trigger to be fired (e.g., if three out of five criteria were satisfied), then the data can include the criteria that caused the trigger to be fired and/or the criteria that did not cause the trigger to be fired.

The payload portion of the trigger can also include data to be made available to the application. The data can be included in the payload portion in different manners. For example, the action in the payload portion that identifies the application can also identify the data that can be obtained by the application. By way of another example, the data can be stored separately in the payload portion, such as using a separate attribute (or other identifier), or a particular part of the payload portion.

The data can be made available to the application in a variety of different manners. In one or more embodiments, monitor module 104 exposes an API that can be invoked by the applications to obtain the data. In other embodiments, an application can obtain the data in other manners, such as using data-binding, receiving a message or other notification from monitor module 104, and so forth.

The following describes an example API that can be exposed by monitor module 104 and invoked by an application to obtain data from a trigger. The API makes use of the following enumeration:

```
public enum EtvObjType
{
    Trigger = 0,
    Session = 1
}
```

A session refers to the playback of particular media content. In one or more embodiments multiple different media content can be played back concurrently (e.g., in different Picture-in-Picture windows, in different frames or other display windows, on different monitors or screens, and so forth). The playback of each of these different media content is referred to as a different session.

The API exposed by monitor module 104 exposes a GetValueCount interface and a GetValue interface. The GetValueCount interface returns the count of sessions or triggers, keys within the sessions or triggers, or values within the sessions or triggers. The GetValue interface returns a particular value.

An example of the GetValueCount is as follows:
uint GetValueCount(EtvObjType ts, string id, string key)
The "ts" parameter indicates either a trigger or session (per EtvObjType above). The "id" parameter is optional, and is an identifier of a particular object (trigger or session). The "key" parameter is optional, and is a particular key for an object or value that can be accessed. The return values for GetValueCount are as follows. If id is null, then GetValueCount returns the object count of either triggers or sessions (depending on ts). If id is defined but key is null, then GetValueCount returns the count of unique keys for the object. If both id and key are defined, then GetValueCount returns the count of the values for the particular key for that object.

An example of the GetValue interface is as follows:
string GetValue(EtvObj Type ts, string id, string key, uint index)
The "ts" parameter indicates either a trigger or session (per EtvObjType above). The "id" parameter is optional. If the id parameter is null, then the index parameter indicates which object in the trigger or session collection to return an identifier for. If the id parameter is not null, then the id parameter indicates a specific object (trigger or session), and the index parameter is used to identify either a key or a value to be returned. The key parameter is also optional. If the key parameter is null, then the index parameter indicates which unique key name to return for the object. If the key parameter is not null, then the key parameter indicates a specific key, and the index parameter is used to return a value for that key. The index parameter is variant, depending on whether an id value and/or key value is supplied, as discussed above. The GetValue interface returns a string, which is an id, key, or value, depending on usage of the GetValue interface.

The following GetDataAndState interface is an example of the use of the GetValueCount interface and the GetValue interface. The GetDataAndState interface accesses a trigger, uses the GetValueCount interface to identify how many values are associated with a particular key, and uses the GetValue interface to retrieve those values.

```
public void GetDataAndState(string path, out string data)
{
    if (path.StartsWith("trigger/"))
    {
        data = null;
        if (!String.IsNullOrEmpty(__lastTriggerId))
        {
            string key = "#" + path.Substring(triggerValuesPrefix.-
               Length);
            if (key.Length > 1 &&
            EtvManager.GetValueCount(EtvManager.EtvObjType.-
               Trigger, __lastTriggerId, key) > 0)
                data =
                EtvManager.GetValue(EtvManager.EtvObjType.-
                   Trigger, __lastTriggerId, key, 0);
        }
    }
}
```

An application can also reference data in a trigger in other manners such as by using data-binding. Generally, data-binding allows an application to reference specific data in the trigger and retrieve or otherwise obtain that data. Data-binding can be accomplished in a variety of different manners. In one or more embodiments, a markup language is used to define data that can be referenced by an application. Monitor module 104 generates an object for each of these data, allowing the application to access the data from these objects.

The following are two example triggers and an example way in which markup language used by an application can be used to reference or bind to the data in the triggers. The first example trigger is:

```
<Event type="trigger" target="mainVideo" action="showInfo"
    data="[CC1:CARROT],[#vegetable:Carrot],[#color:Orange]" />
```

In this first example, a trigger is defined with the criteria being a program titled "mainVideo". If that criteria is satisfied, then the action "showInfo" indicates that the application is to alter its display based on the data in the trigger. The second example trigger is:

```
<Event type="trigger" target="mainVideo" action="showInfo"
    data="[CC1:CABBAGE],[#vegetable:Cabbage],[#color:Green]" />
```

In this second example, a trigger is defined with the criteria being a program titled "mainVideo". If that criteria is satisfied, then the action "showInfo" indicates that the application is to alter its display based on the data in the trigger.

These two example triggers can be referenced or bound to using the following example markup language:

```
<Text id="vegetableName" DataSource="{Binding Source=mainVideo,
Path=trigger/vegetable}" />
<Text id="vegetableColor" DataSource="{Binding Source=mainVideo,
Path=trigger/color}" />
```

The first part of this example markup language indicates that when the "mainVideo" media content is being presented, then an application is to access a "vegetable" value in the trigger to obtain the value for a "vegetableName" field of a form being displayed by the application. Similarly, the second part of this example markup language indicates that when the "main-Video" media content is being presented, then the application is to access a "color" value in the trigger to obtain the value for a "vegetableColor" field of the form being displayed by the application. Accordingly, if the first example trigger above were used, then the application would display the form with the "vegetableName" field of "Carrot" and the "vegetable-Color" field of "Orange". Similarly, if the second example trigger above were used, then the application would display the form with the "vegetableName" field of "Cabbage" and the "vegetableColor" field of "Green".

Monitor module 104 can be implemented to monitor the data of media content 108 and compare it to triggers 112 in a variety of different manners. In one or more embodiments, monitor module 104 (or alternatively another component or module) generates trigger objects, session objects, and data objects. A trigger object is generated for each trigger 112 and includes the criteria and actions to be performed from the criteria and payload portions of the trigger 112. A session object is also generated that describes the current media content session. The session object includes data of the media content (e.g., channel number via which the media content is being received, call sign of the channel via which the media content is being received, title of the programming that is distributed as the media content, and so forth). Metadata of the media content (or other types of data being monitored by module 104) is typically not included in this session object but rather is analyzed as it is received. Alternatively, this metadata or other type of data can be included in the session object. The data objects include data from triggers that can be referenced by applications, as discussed above.

Triggers 112 can be provisioned triggers and/or application-based triggers. A provisioned trigger refers to a trigger that is distributed to consumer device 100 by some remote device or component. This distribution is initiated by the remote device or component, and the provision triggers typically remain in trigger store 106 until they expire or are updated by the remote device or component. An application-based trigger refers to a trigger that is added to trigger store 106 by an application or module running on consumer device 100. Application-based triggers typically remain in trigger store 106 while the application is running, and are removed from trigger store 106 when the application stops running. Triggers 112 can be embedded in media content 108, or alternatively obtained from other sources.

In one or more embodiments, all of the criteria included in the criteria portion of the trigger need to be satisfied in order for the one or more actions for presenting advertising content to be performed. Alternatively various logical operators, such as "AND" and "OR", can be used in conjunction with the criteria to allow different combinations to be defined. For example, four different criteria could be listed, at least one of which is to be satisfied in order for the one or more actions for presenting advertising content to be performed. By way of another example, three different criteria could be listed, a particular one of which and either one (or both) of the other two is (are) to be satisfied in order for the one or more actions for presenting advertising content to be performed.

Additionally, it should be noted that criteria can be full-match or partial-match criteria. Full-match criteria indicates that the criteria is to match the data of the programming content exactly, whereas partial-match criteria indicates that the data of the programming is to include at least the partial-match criteria. For example, if the data of the programming were "Microsoft Corporation" and the criteria were "Corporation", then the criteria would be a partial-match to the data of the programming but not a full-match. Whether criteria is full-match or partial-match can be inherent in the particular criteria, or identified in other manners such as including a flag or other value with the criteria indicating whether it is full-match or partial-match.

Furthermore, partial-match criteria can be a "starts-with" partial-match, an "anywhere" partial-match, or other type of partial-match. A starts-with partial-match indicates that the data of the programming is to start with the criteria, whereas an anywhere partial-match indicates that the criteria can be included anywhere in the data of the programming. For example, if the data of the programming were "Microsoft Corporation" and the criteria were "Corporation", then the criteria would be an anywhere partial-match to the data of the programming but not a starts-with partial-match. Other types of partial matches can also be defined using regular expressions. For example, quantifiers or wild cards can be used, such as "*" to indicate zero or more characters, "?" to indicate zero or one characters, and so forth. Whether partial-match criteria is starts-with or anywhere criteria, or alternatively other criteria, can be inherent in the particular criteria or can be identified in other manners such as including a flag or other value with the criteria indicating whether it is starts-with or anywhere.

In one or more embodiments, trigger result 114 is presented for a particular amount of time. The duration of the presentation of trigger result 114 can be the same for all triggers, or alternatively vary by trigger. In one or more embodiments, each trigger 112 includes as part of its payload portion an identifier of the duration of the presentation of trigger result 114 for that particular trigger. Alternatively, the duration can be identified in different manners. For example, monitor module 104 can be programmed or otherwise configured with an indication of the duration, media content 108 can identify durations for trigger results occurring during presentation of media content 108, and so forth.

Additionally, in one or more embodiments monitor module 104 performs the actions in a trigger once. After the actions have been performed once, monitor module 104 no longer performs the actions even though the criteria of the trigger may be satisfied. Alternatively, in other embodiments monitor module 104 can perform the actions in a trigger each time the criteria are satisfied. In such embodiments, monitor module 104 can restrict how frequently the actions can be performed. For example, even though the criteria may be satisfied every 30 seconds, monitor module 104 can restrict the actions to being performed no more than once every five minutes.

Such restrictions can be imposed by monitor module 104 in a variety of different manners. In one or more embodiments, a trigger 112 includes an indication of how frequently the actions can be performed. This indication can be included, for example, in the payload portion of the trigger. When the criteria of a trigger are satisfied and the one or more actions performed, monitor module 104 obtains an indication of how frequently the one or more actions can be performed. This indication can indicate a time (e.g., 30 seconds, five minutes, once per day, etc.), in which case monitor module 104 does not perform the one or more actions until after that amount of time has elapsed. Monitor module 104 need not check whether the criteria of that trigger are satisfied until after that indicated frequency is passed. Alternatively, monitor module 104 may check whether the criteria of the trigger are satisfied, but not perform the one or more actions until after that indicated frequency is passed. Alternatively, this indication can be a count value (e.g., 5, 8, 12, 50, etc.), in which case monitor module 104 keeps track of how many times the one or more actions have been performed in response to the criteria being satisfied, and does not perform the one or more actions after the count value has been reached. This count value can optionally be reset at regular or irregular intervals (e.g., hourly, daily, each time a new program begins or a channel change occurs, and so forth).

It should be noted that conflict situations can arise where the criteria of multiple different triggers are satisfied concurrently. Such conflicts can be resolved in a variety of different manners. In one or more embodiments, each trigger includes a priority value and the conflict is resolved by performing the actions for the trigger with the higher priority value. In other embodiments, monitor module 104 can keep track of when the actions for the different triggers have been performed. In such embodiments, these conflicts can be resolved by performing the actions for the trigger that least recently had its actions performed. Alternatively, these conflicts can be resolved in other manners, such as random selection of a trigger, concurrent presentation of multiple triggers, selecting a trigger based on payments received, selecting triggers according to some other criteria or rules, and so forth.

As discussed above, a variety of different criteria can be included in the criteria portion of a trigger. Table I lists example criteria that can be included in the criteria portion of a trigger in accordance with one or more embodiments. It is to be appreciated that Table I lists only example criteria; not all of the criteria in Table I need be used, or alternatively additional criteria can be included.

Some additional example triggers and trigger formats are discussed in the following. It is to be appreciated that these are only examples, and that other formats and triggers can be used with the referencing data in triggers from applications discussed herein. One example trigger is:

[TITLE:xyz], [EVENT:act1, parameter1]

This example trigger indicates that the criteria are a program title (TITLE) is to be "xyz". If that criteria is satisfied then an action (EVENT) of "act1" with a parameter of "parameter1" is to be performed. This action "act1" can be, for example, launching an application or notifying an already executing application. Additionally, the "parameter1" value can be referenced by the application as data in a variety of different manners as discussed above. Furthermore, other data from the trigger, such as the title, could be referenced by the application.

Another example trigger is:

[TITLE:xyz], [CHANNEL:274], [EVENT:someURL]

This example trigger indicates that the criteria are: a program title (TITLE) is to be "xyz", and a channel on which the program is played back (CHANNEL) is to be "274". If the criteria are satisfied, the content at a particular location identified by "someURL" is to be displayed or otherwise presented. In this example, the application is inherent in the trigger (e.g., the application is a Web browser). Furthermore, other data from the trigger, such as the title or the channel, could be referenced by the application in a variety of different manners as discussed above.

Figure 3:
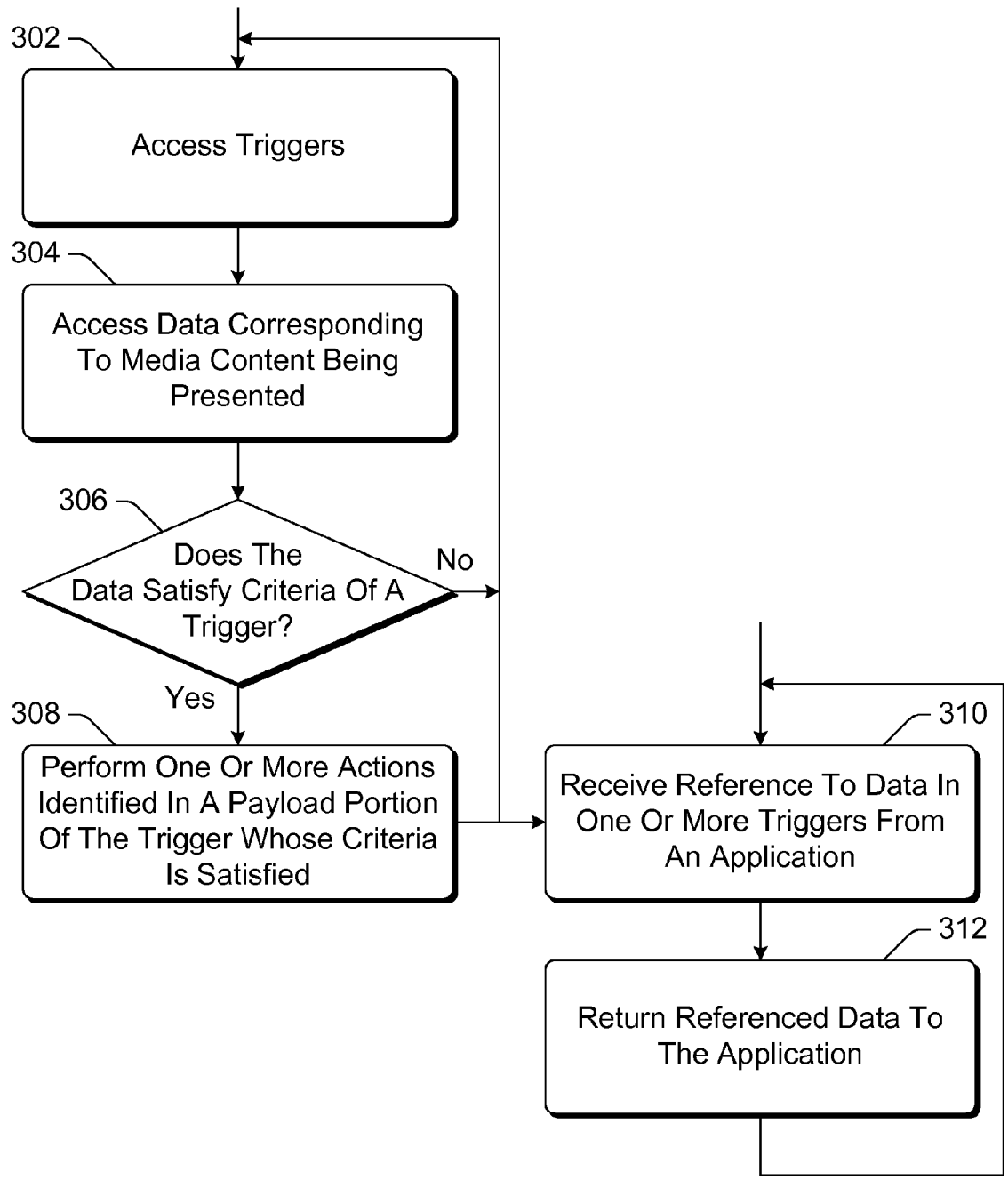
FIG. 3 is a flowchart illustrating an example process for referencing data in triggers from applications in accordance with one or more embodiments.

FIG. 3 is a flowchart illustrating an example process 300 for referencing data in triggers from applications in accordance with one or more embodiments. Process 300 is carried out by a device, such as consumer device 100 of FIG. 1, and

TABLE I

| Criteria | Description |
| --- | --- |
| Keyword | One or more keywords to occur in the media content. |
| Title | The title of a program that is included in the media content. |
| Episode | The episode of a program that is included in the media content. |
| Description | A description of a program that is included in the media content. |
| Actor List | One or more actors or actresses that appear in a program that is included in the media content. |
| Director | One or more directors of a program that is included in the media content. |
| Currently tuned channel call sign | A call sign of the channel via which the media content is being received. |
| Currently tuned channel number | A number of the channel via which the media content is being received. |
| DateTime Beginning | A beginning date and/or time for the trigger. This criteria is satisfied only if the current date and/or time is after the beginning date and/or time. |
| DateTime Ending | An ending date and/or time for the trigger. This criteria is satisfied only if the current date and/or time is before the ending date and/or time. |
| DateTime Expire | An expiration date and/or time for the trigger. This criteria is satisfied only if the current data and/or time is before the expiration date and/or time. The trigger can optionally be removed (e.g., by monitor module 104) after the expiration date and/or time. |
| Program-relative Beginning Time | A time value which is added to the program's beginning DateTime. If no time value is specified, then the program's beginning DateTime is used. This derived value is then used as the comparison criteria, comparing against the current DateTime value. This criteria is satisfied only if the current DateTime is greater than or equal to the derived value. |
| Program-relative Ending Time | A time value which is added to the program's beginning DateTime. If no time value is specified, then the program's ending DateTime is used. This derived value is then used as the comparison criteria, comparing against the current DateTime value. This criteria is satisfied only if the current DateTime is less than or equal to the derived value. | can be implemented in software, firmware, hardware, or combinations thereof. Process 300 is an example process for referencing data in triggers from applications; additional discussions of referencing data in triggers from applications are included herein with reference to different figures.

In process 300, triggers are accessed (act 302). Each trigger can be accessed in a variety of different manners, such as by retrieving the trigger from a trigger store as discussed above. Additionally, data corresponding to media content is accessed (act 304). This data corresponding to media content can include the media content itself (e.g., metadata, audio data, video data, and so forth) as well as other data describing the media content or its presentation (e.g., an identifier of the media content, a channel via which the media content is received, and so forth).

A check is then made as to whether the data corresponding to the media content satisfies the criteria of one or more of the triggers (act 306). A variety of different criteria can be included in a trigger, as discussed above. This check is repeated until the criteria of one of the triggers is satisfied. When the criteria of one of the triggers is satisfied, one or more actions included in a payload portion of that one trigger are performed (act 308). These one or more actions can include a variety of different actions, as discussed above.

Process 300 then returns to act 302, continuing to access triggers and data corresponding to media, and checking whether the data corresponding to the media content satisfies the criteria of one of the triggers.

Additionally, data in the one trigger is also referenced by an application (act 310), and the referenced data is returned to the application (act 312). As discussed above, this reference can be received in a variety of different manners as discussed above, such as through an API, through data-binding, and so forth. It should also be noted that the data in the trigger can be stored in different forms, such as being stored in a markup language file, being stored in an object, and so forth. Additionally, as discussed above the application referencing the data can be launched by the firing of the trigger (e.g., as one of the actions in act 308), or can be an already executing application. Accordingly, acts 310 and 312 can be performed after act 308, or alternatively can be performed independently of acts 302-308 (e.g., can be performed whenever an application references data in a trigger regardless of whether the criteria of the trigger are satisfied). Process 300 then returns to act 310 to receive another reference to data in a trigger from an application.

Figure 4:
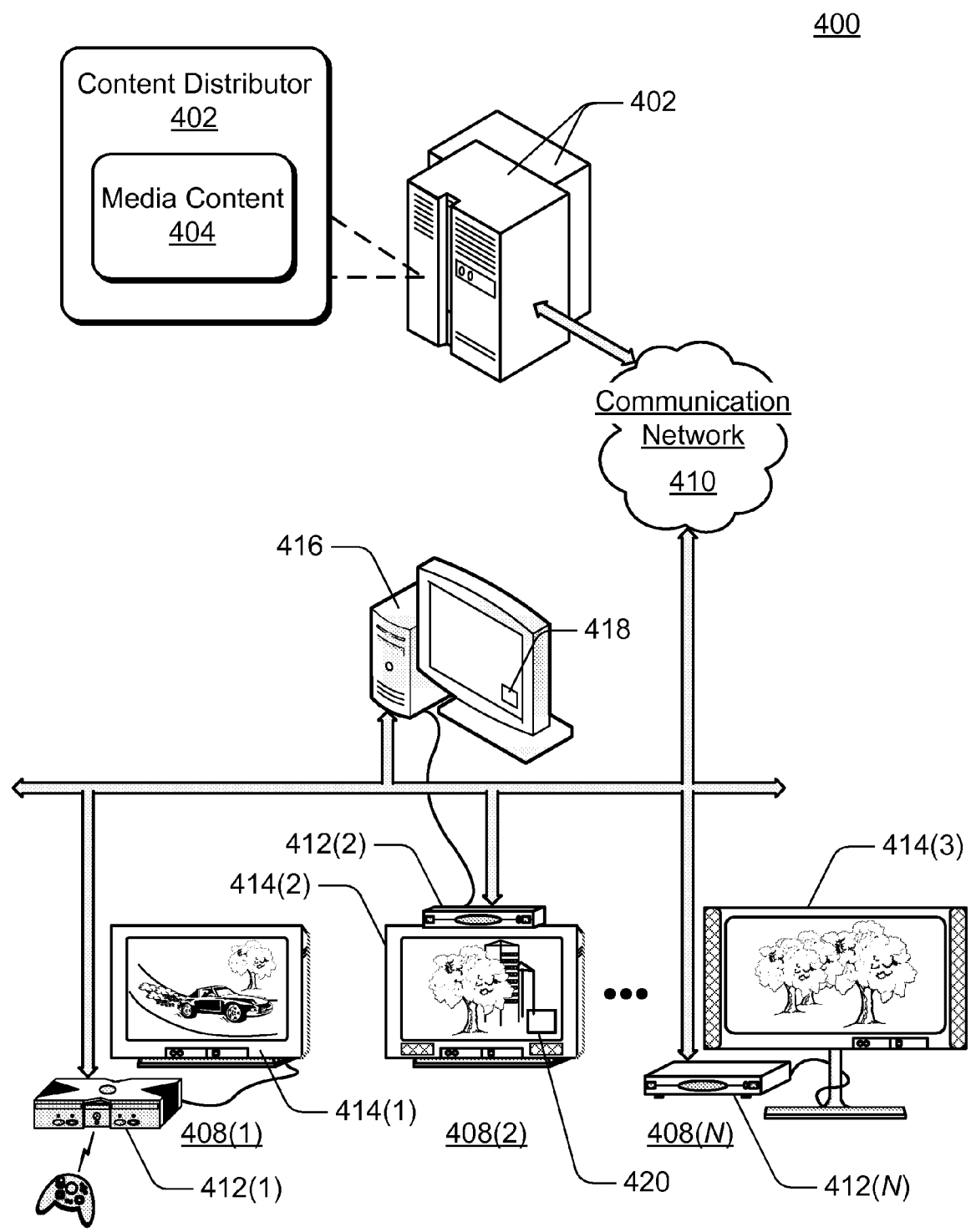
FIG. 4 illustrates an example system in which one or more embodiments of referencing data in triggers from applications can be implemented.

FIG. 4 illustrates an example system 400 in which one or more embodiments of referencing data in triggers from applications can be implemented. System 400 includes one or more content distributors 402 that communicate media content 404 to any number "N" of various television client systems 408(1-N) via a communication network 410. Client systems 408 can each be, for example, a different type (or alternatively the same types) of consumer device 100 of FIG. 1. Communication network 410 can be implemented to include an IP-based network that facilitates media content distribution and data communication between the content distributor(s) 402 and any number of television client devices.

Each of client systems 408(1-N) includes a respective television client device 412(1-N) and a respective display device 414(1-N), such as any type of television, monitor, LCD, projector, or similar television-based display system that renders audio, video, and/or image data. Any of client devices 412(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of television client devices 412(1-N) may also be associated with a user (e.g., a person) and/or an entity that operates a client device such that a television client device describes logical clients that include users, software, and/or devices.

Any of television client devices 412(1-N) of the respective client systems 408(1-N) can be implemented with one or more processors, a communication module, memory components, a media content rendering system, and a monitor module and trigger store to implement embodiments of referencing data in triggers from applications. Additionally, each of television client devices 412(1-N) can be configured for communication with any number of different content distributors 402 to receive any type of media content 404 via the communication network 410. Further, any of the television client devices 412(1-N) can be implemented with any number and combination of differing components as further described with reference to the example client device shown in FIG. 5.

In this example of FIG. 4, client device 412(2) is a television set-top box that is connected, or otherwise communicatively linked, to a computing device 416 that can be implemented to display trigger results 418. Although example trigger results 418 are illustrated in FIG. 4, it is to be appreciated that trigger results 418 can be presented in other manners as discussed above. Computing device 416 can also be configured for communication with a content distributor 402 to receive the trigger (e.g., triggers 112 of FIG. 1) via the communication network 410.

Figure 5:
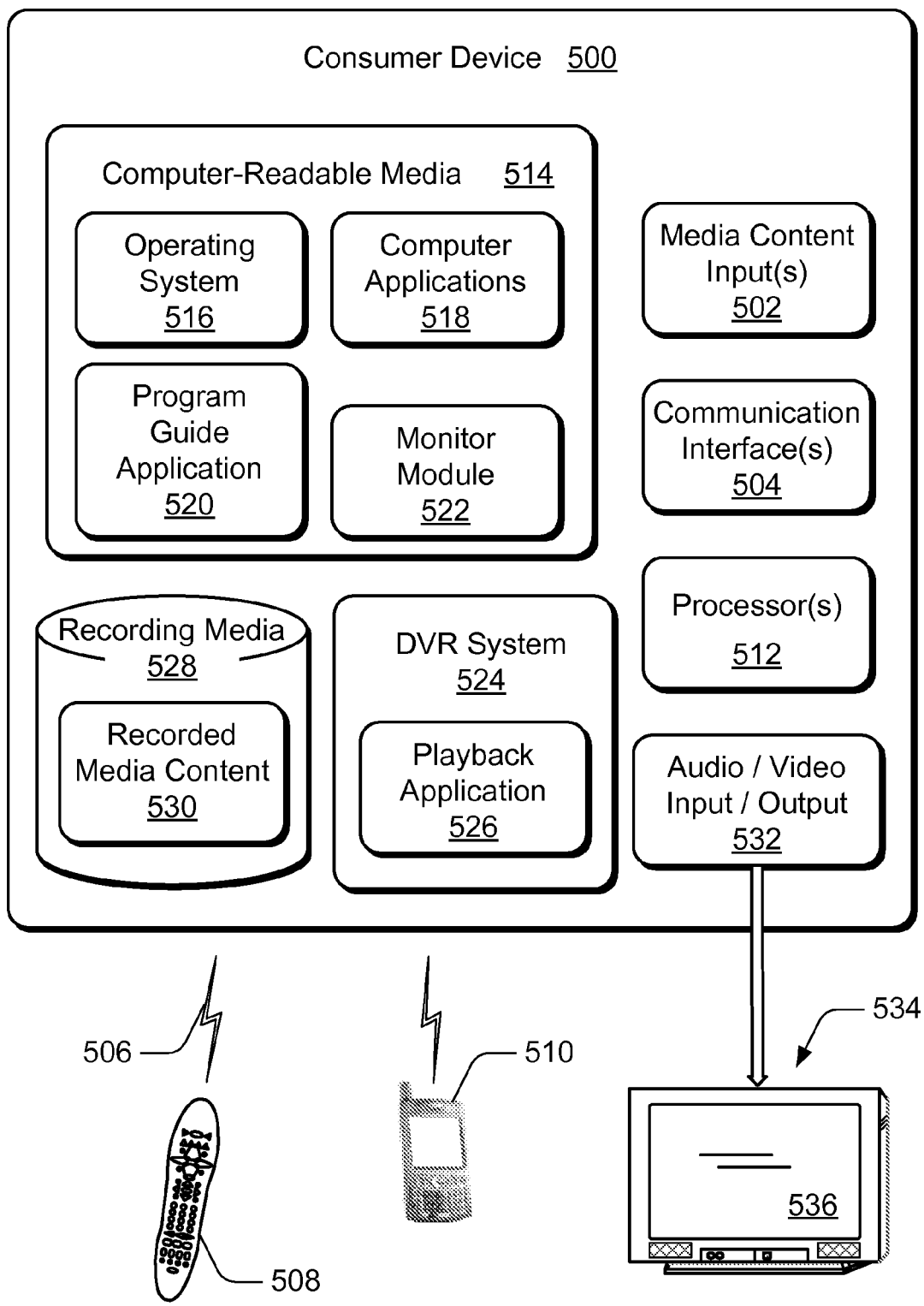
FIG. 5 illustrates various components of an example consumer device that can implement one or more embodiments of referencing data in triggers from applications.

FIG. 5 illustrates various components of an example consumer device 500 that can be implemented as any form of a computing, electronic, or television client device to implement one or more embodiments of referencing data in triggers from applications. For example, consumer device 500 can be implemented as consumer device 100 shown in FIG. 1, and/or as any of the client devices 412(1-N) of client systems 408(1-N) shown in FIG. 4. In various embodiments, consumer device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Consumer device 500 includes one or more media content inputs 502 that may include Internet Protocol (IP) inputs over which streams of media content are received via an IP-based network. Consumer device 500 further includes communication interface(s) 504 that can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular phone) 510, or from another infrared (IR), 802.11, Bluetooth, or similar RF input device.

A network interface provides a connection between consumer device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Consumer device 500 also includes one or more processors 512 (e.g., any of microprocessors, controllers, and the like) which process various computer-executable instructions to control the operation of device 500, to communicate with other electronic and computing devices, and to implement embodiments of referencing data in triggers from applications. Consumer device 500 can be implemented with computer-readable media 514, such as one or more memory components, examples of which include random access memory (RAM), nonvolatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 514 provides data storage mechanisms to store various information and/or data such as software applications and any other types of information and data related to operational aspects of consumer device 500. For example, an operating system 516 and/or other computer applications 518 can be maintained as software applications with the computer-readable media 514 and executed on processor(s) 512 to implement embodiments of the referencing data in triggers from applications.

Consumer device 500 can also include a program guide application 520 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer. Consumer device 500 can also include a monitor module 522 (shown as a software module in this example) to implement various embodiments of referencing data in triggers from applications as described herein.

Consumer device 500 can also include a DVR system 524 with playback application 526, and recording media 528 to maintain recorded media content 530 that consumer device 500 receives and/or records. Further, consumer device 500 may access or receive additional recorded media content that is maintained with a remote data store (not shown). Consumer device 500 may also receive media content from a video on-demand server, or media content that is maintained at a broadcast center or content distributor that distributes the media content to subscriber sites and client devices. Playback application 526 is a video control application that can be implemented to control the playback of media content, the recorded media content 530, and/or other video on-demand media content, music, and any other audio, video, and/or image media content which can be rendered and/or displayed for viewing. Playback application 526 can be, for example, media content playback module 102 of FIG. 1.

Consumer device 500 also includes an audio and/or video output 532 that provides audio and/or video data to an audio rendering and/or display system 534. Audio rendering and/or display system 534 can include any devices that process, display, and/or otherwise render audio, video, and image data. Video signals and audio signals can be communicated from consumer device 500 to a display device 536 via an RF (radio frequency) link, S-video link, composite video link, component video link, DVI (digital video interface), analog audio connection, or other similar communication link. Alternatively, audio rendering and/or display system 534 can be implemented as integrated components of the example consumer device 500. Consumer device 500 along with the audio rendering and/or display system 534 is an example of a viewing system that can be implemented in a household viewing area for viewing television programs and/or receiving other television media content.

Figure 6:
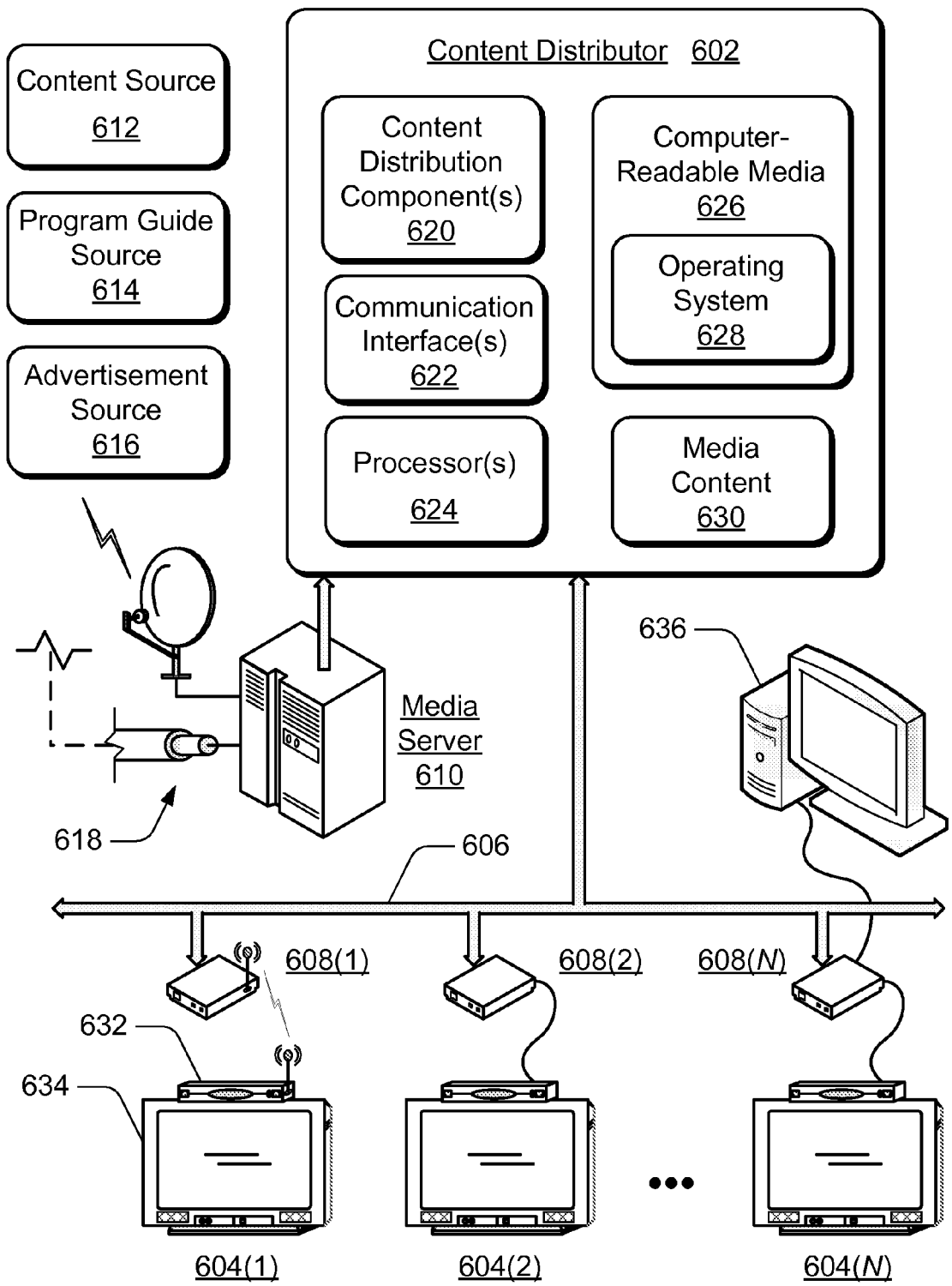
FIG. 6 illustrates an example entertainment and information system in which one or more embodiments of referencing data in triggers from applications can be implemented.

FIG. 6 illustrates an example entertainment and information system 600 in which one or more embodiments of referencing data in triggers from applications can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 408(1-N) described with reference to FIG. 4. Each of the client systems 604(1-N) can receive data streams of media content, media content, program guide data, advertising content, closed captioning data, and the like from content server(s) of content distributor 602 via communication network 606.

Communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and client systems 604(1-N).

System 600 includes a media server 610 that receives media content from a content source 612, program guide data from a program guide source 614, and advertising content from an advertisement source 616. This advertising content can be advertising content associated with triggers as discussed above (e.g., advertising content displayed when the criteria of a trigger is satisfied), and/or different advertising content presented to users of system 600. In one or more embodiments, media server 610 represents an acquisition server that receives the audio and video media content from content source 612, an EPG server that receives the program guide data from program guide source 614, and/or an advertising management server that receives the advertising content from the advertisement source 616.

Content source 612, program guide source 614, and advertisement source 616 control distribution of the media content, the program guide data, and at least some of the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the media content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604 (1-N)). Content distributor 602 can be implemented as a satellite operator, a network television operator, a cable operator, and the like to control distribution of media content, program and advertising content, such as movies, television programs, commercials, music, and other audio, video, and/or image content to client systems 604(1-N).

Content distributor 602 includes various content distribution components 620 to facilitate media content processing and distribution, such as a subscriber manager, a device monitor, and one or more content servers. The subscriber manager manages subscriber data, and the device monitor monitors client systems 604(1-N) (e.g., and the subscribers), and maintains monitored client state information.

Although the various managers, servers, and monitors of content distributor 602 (to include media server 610 in one or more embodiments) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of referencing data in triggers from applications.

Content distributor 602 includes communication interface(s) 622 that can be implemented as any type of interface to communicate and receive data from client devices of the television system. Content distributor 602 also includes one or more processors 624 (e.g., any of microprocessors, controllers, and the like) which process various computer-executable instructions to control the operation of content distributor 602. Content distributor 602 can be implemented with computer-readable media 626 which provides data storage to maintain software applications such as an operating system 628 and media content 630 for distribution to the client systems 604(1-N).

Client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. The computing device 636 is an example of a connected data store that can record and maintain media content for a client device. Additionally, any client device 632 of a respective client system 604 can implement features and embodiments of referencing data in triggers from applications as described herein.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices. The features of the referencing data in triggers from applications techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a trigger store to store multiple triggers, each of the multiple triggers comprising a criteria portion and a payload portion, the criteria portion identifying a plurality of criteria, wherein the plurality of criteria comprises at least an identifier of particular media content, and the payload portion identifying one or more actions to be performed; and
   a monitor module, executed by a processor of the device, coupled to the trigger store, to implement operations comprising:
   monitoring data corresponding to media content being presented, to detect that the data satisfies the plurality of criteria of one of the multiple triggers,
   performing the one or more actions identified in the one trigger responsive to the data satisfying the plurality of criteria, the one or more actions including displaying an advertisement,
   allowing data in the trigger to be referenced by an application executing on the device, to expose an Application Programming Interface (API) to be invoked by the application to obtain data from the trigger, the API including an interface to return a count of triggers, the count of triggers preventing the displaying the advertisement to occur until a count value of the trigger has been reached, and
   returning the data from the trigger to the application responsive to the API being invoked by the application.

2. A device as recited in claim 1, wherein performing the one or more actions includes launching the application.

3. A device as recited in claim 1, the data from the trigger comprising at least one of the plurality of criteria of the trigger.

4. A device as recited in claim 1, the data from the trigger being included in the payload portion of the trigger.

5. A device as recited in claim 1, wherein the criteria portion of each of the multiple triggers allows more than one of the multiple triggers stored on the device to be satisfied concurrently.

6. A computer-implemented method comprising:
   using a trigger store, on a computing device, to store multiple triggers, each of the multiple triggers comprising a criteria portion and a payload portion, the criteria portion identifying a plurality of criteria, wherein the plurality of criteria comprises at least an identifier of particular media content, and the payload portion identifying one or more actions to be performed; and
   using a monitor module, executed by a processor of the computing device, coupled to the trigger store to implement operations comprising:
   monitoring data corresponding to media content being presented,
   detecting that the data satisfies the plurality of criteria of one of the multiple triggers,
   performing the one or more actions identified in the one trigger responsive to the data satisfying the plurality of criteria, the one or more actions including displaying an advertisement,
   allowing data in the trigger to be referenced by an application executing on the computing device,
   exposing an Application Programming Interface (API) to be invoked by the application to obtain data from the trigger, the API including an interface to return a count of triggers, the count of triggers preventing the displaying the advertisement to occur until a count value of the trigger has been reached, and returning the data from the trigger to the application responsive to the API being invoked by the application.

7. The computer-implemented method as recited in claim 6, wherein performing the one or more actions includes launching the application.

8. The computer-implemented method as recited in claim 6, the data from the trigger comprising at least one of the plurality of criteria of the trigger.

9. The computer-implemented method as recited in claim 6, the data from the trigger being included in the payload portion of the trigger.

10. The computer-implemented method as recited in claim 6, wherein the criteria portion of each of the multiple triggers allows more than one of the multiple triggers stored on the device to be satisfied concurrently.

* * * * *